United States Patent
Stoll et al.

[11] Patent Number: 5,813,313
[45] Date of Patent: Sep. 29, 1998

[54] PISTON FOR A FLUID POWER CYLINDER

[75] Inventors: Kurt Stoll, Esslingen; Dieter Waldmann, Ebersbach, both of Germany

[73] Assignee: Festo KG, Esslingen, Germany

[21] Appl. No.: 847,451

[22] Filed: Apr. 24, 1997

[30] Foreign Application Priority Data

May 3, 1996 [DE] Germany .................. 296 07 993.6

[51] Int. Cl.⁶ ........................................... F01B 25/26
[52] U.S. Cl. .......................... 92/5 R; 92/244; 92/249; 92/256
[58] Field of Search ............. 92/5 R, 240, 242, 92/243, 244, 249, 255, 256

[56] References Cited

U.S. PATENT DOCUMENTS

| | | |
|---|---|---|
| 2,739,856 | 3/1956 | Martin . |
| 2,984,529 | 5/1961 | Dailey ................................. 92/243 X |
| 4,378,726 | 4/1983 | Stoll ........................................ 92/243 |
| 4,875,405 | 10/1989 | Bernhardt et al. ................... 92/240 X |
| 4,896,584 | 1/1990 | Stoll et al. .............................. 92/5 R |
| 5,353,689 | 10/1994 | Bolt et al. ............................. 92/240 X |

FOREIGN PATENT DOCUMENTS

| | | |
|---|---|---|
| 0 093 859 A2 | 11/1983 | European Pat. Off. . |
| 0 351 317 A1 | 1/1990 | European Pat. Off. . |
| 77 03 341 | 7/1977 | Germany . |
| 29 17 232 A1 | 11/1979 | Germany . |
| 34 04 095 A1 | 8/1985 | Germany . |
| 38 26 931 A1 | 2/1990 | Germany . |
| 41 22 481 C2 | 1/1993 | Germany . |
| 5 09 527 | 8/1971 | Switzerland . |

Primary Examiner—Hoang Nguyen
Attorney, Agent, or Firm—Hoffmann & Baron, LLP

[57] ABSTRACT

A piston for a fluid power cylinder, which possesses two separate piston parts, which are detachably set together in a joint region axially with a sealing action. Each piston part has a rigid carrying element, which is molded on a holding portion, which in its radially outer region has a lip seal comprising sealing material with rubber-elastic properties and serving for sealing on a piston running face. The respective lip seal and the holding portion associated with same are constituted by components of an integral elastic body comprising a sealing material with rubber-elastic properties. Such elastic body is molded on the respectively associated carrying element. The two elastic bodies are in sealing contact with one another in the joint zone.

18 Claims, 2 Drawing Sheets

PISTON FOR A FLUID POWER CYLINDER

BACKGROUND OF THE INVENTION

The invention relates to a piston for a fluid power cylinder comprising two separate piston parts which are placed together axially in a joint region at mutually facing joint faces with a sealing effect, each piston part possessing a rigid carrying element having a central section with a central aperture for the attachment of a piston rod, said rigid carrying element possessing an annular carrying section arranged externally radially on the said central section, and the two piston parts having central sections thereof resting against one another in the joint region, whereas their carrying sections are set together with an axial clearance from each other and between them enclose at least a part of an annular holding chamber arranged in the joint region and suitable for accommodating an annular permanent magnet, said chamber having a limiting wall being formed by holding portions molded on the carrying elements, such holding portions possessing furthermore, in a radially outer region thereof, respectively a lip seal, which comprises a sealing material with rubber-elastic properties and serving for sealingly engaging a running face of the piston.

THE PRIOR ART

A piston of this type is for instance disclosed in the German patent publication 3,404,095 C2. The piston comprises two piston parts, which abut together in a joint region and are able to be so fixed on a piston rod by attachment means that they constitute a releasable unit. In the joint region holding recesses are formed in the holding parts which complement each other to present a holding chamber, in which an annular permanent magnet is received which in operation serves for the contactless actuation of a sensor arranged to the side of its path of displacement. Lip seals located in peripheral grooves in the holding portions serve, in operation, for providing a sealing action between the piston and the cylindrical piston running face of a cylinder housing. An O-ring seal placed between the carrying elements serves to prevent any uncontrolled escape of pressure medium, employed for operation of the fluid power cylinder, through the joint region.

Although the prior art piston has been found quite satisfactory in use, an improvement for the purpose of reducing the costs of manufacture appears to be called for. The necessary number of separate components in the known piston hardly allows any freedom as regards saving costs.

SHORT SUMMARY OF THE INVENTION

One object of the invention is consequently to provide a piston of the sort noted initially which while possessing a simple structure may be produced at lower costs.

In order to achieve these and/or other objects appearing from the present specification, claims and drawings, in the present invention each respective lip seal and the holding portion associated with same are constituted by components of an integral elastic body comprising of a sealing material with rubber-elastic properties, said body being molded on the respectively associated carrying element, in the joint region the two elastic bodies engaging one another in at least one sealing zone forming a complete ring surrounding the central aperture and being in sealing engagement with each other.

Furthermore the invention contemplates a piston, which is composed of two piston parts, which, given a suitable mechanical design thereof, may also be employed singly as pistons. In comparison with the prior art the design of the piston or, respectively, of the individual pistons is however substantially simplified and renders possible manufacture in a less cost intensive manner. The lip seal and the holding portion of a respective piston part are combined together to form an integral elastic body, which may be molded in a single working step on the carrying element. Dependent on the nature of the material employed the carrying element may be manufactured, for instance, by injection casting or by vulcanizing on. Owing to the rubber-elastic properties of the material of the holding portion and the resiliency resulting therefrom there is the further advantage that the permanent magnet is not subject to high pressure forces even as a result of small inaccuracies in manufacture. On clamping together the piston parts would act on same by way of the limiting wall of the holding chamber. The possibility of a certain amount of allowance for manufacturing inaccuracies is provided for. A further substantial advantage is that the required sealing function between the two piston parts is also integrated in the elastic body. Such parts are in sealing engagement with each other in the sealing zone so that even without any additional sealing ring it is possible to prevent any escape of pressure medium in the joint region.

Although the European patent publication 0 093 859 A2 has also disclosed a piston, in the case of which a permanent magnet is completely incased in sealing material forming the sealing lips as well, in this case the piston is in the form of a pre-fabricated unit lacking any joint region, at which two piston parts could be joined together so as to releaseably encompass the permanent magnet. Accordingly there is also an absence of particulars about the required measures for sealing in the joint region between the two piston parts.

The German patent publication 4,122,481 C2 discloses a piston, which has two disk-like piston elements, between which a damping element, a permanent magnet and a sealing ring are arranged. All these components are however designed in the form of separate parts. There are here no molded elastic bodies with the multiple function in accordance with the present invention.

Advantageous further developments of the invention are recited in the claims.

The sealing contact in the sealing zone between the two piston parts is preferably produced by the cooperation of two sealing portions in the form of a separate complete or closed ring, of which at least one is in the form of a axial projection, which on pressing the piston parts together is deformed so that while ensuring a highly satisfactory sealing action the sealing portions may pressed together in tight contact. Preferably at least one of the sealing portions is designed in the form of a sealing edge.

An arrangement which is more particularly preferred is one in which the sealing zone is located radially in the holding chamber, it preferably being arranged adjacent to the radially inner section of the limiting wall of the holding chamber. The edge as a sealing portion which is present in the transitional zone between the joint face of the limiting wall of a respective holding portion may be designed as a sealing portion.

On at least one and preferably on both axial sections of the limiting wall of the holding chamber it is preferred for several holding projections to be molded arranged with a clearance apart to extend peripherally, such projections more especially having a knob-like configuration. They extend axially right into the holding chamber and act on a permanent magnet arranged therein so that same is held free of clearance while at the same time compensating for manufacturing inaccuracies.

Preferably the terminal face, axially opposite to the joint region, of the carrying section is coated by its associated elastic body, the elastic body in this region preferably having several peripherally arranged and spaced apart humps, which owing to the rubber-elastic material properties may function as impact buffers, which may attenuate the impact of the piston against the cylinder end plate at the end of the stroke.

An other preferred feature of the invention is such that the integral elastic body extends as far as the end face, axially opposite to the joint region, of the central section of the associated carrying element where it constitutes a sealing portion, which is capable of sealingly cooperating with a piston rod, to be attached in the aperture or with the attachment means employed for attachment. Without additional sealing rings it is thus possible to prevent pressure medium from escaping through the aperture between the cylinder chambers partitioned off by the piston.

Preferably the respective elastic body has a guide function integrated in it by having its radially outer face designed to serve as a guide face, which in operation is in sliding contact with the piston's running face.

A further reduction in costs in manufacture of the piston is possible if the two carrying elements are designed in the form of carrying disks, at least one and preferably at least both carrying disks having a stepped, hat-like configuration with a disk-like perforated central section and a carrying section which in relation to this central section is offset by a peripheral step axially. Carrying disks designed in this manner may be more especially produced as stamped and bent parts. Piston parts assembled together on the basis of such carrying disks in addition possess an extremely compact axial size and thus lead to the advantage of being able to produce so-called short stroke cylinders.

In this connection the stepped configuration produces the further advantage that on the one hand sufficient accommodating space is provided between the carrying sections for the permanent magnet and on the other hand the side axially opposite to the joint region, of the recess surrounded by the step, of each respective carrying element may be employed as a centering recess, in which a return spring may be borne operating in connection with single acting fluid power cylinders.

In what follows the invention will be described with reference to the accompanying drawings.

LIST OF THE SEVERAL VIEWS OF THE FIGURES

DETAILED ACCOUNT OF WORKING EMBODIMENT OF THE INVENTION

Figure 1:
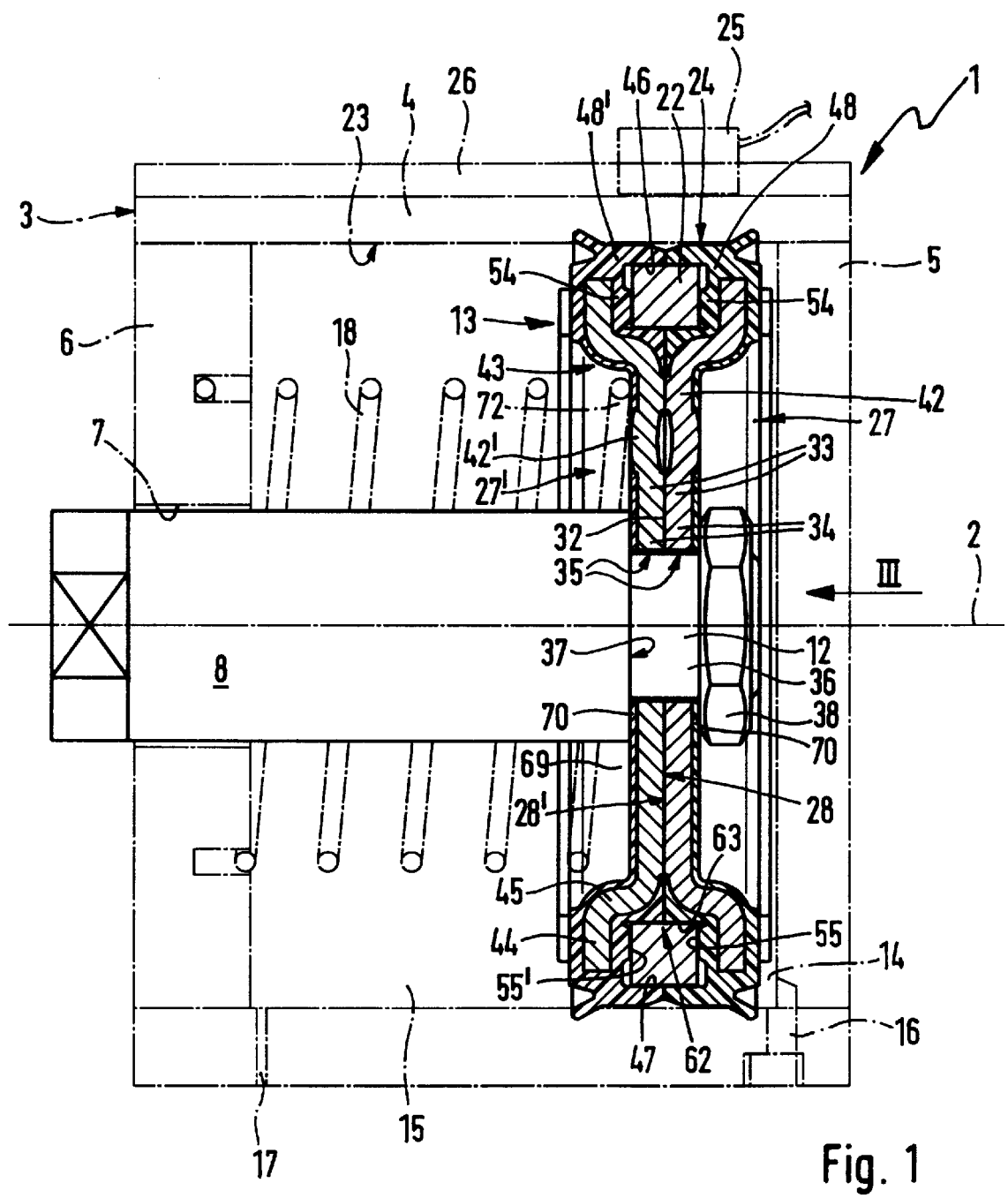
FIG. 1 is a longitudinal section taken through a first design of the piston of the invention including a piston rod secured thereto, further components of a fluid power cylinder containing the piston in accordance with the embodiment being indicated in chained lines.
Figure 3:
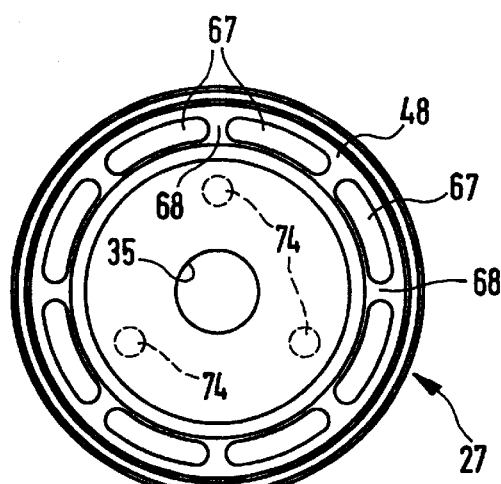
FIG. 3 is an axial plan view of the piston of FIG. 1 looking in the direction without showing the piston rod and the cylinder housing.

With some portions indicated diagrammatically in chained lines, FIG. 1 shows a fluid and more particularly pneumatically run fluid power cylinder, in the case of which it is preferably as question of a so-called short stroke cylinder, which axially in the direction of the longitudinal axis 2 has particularly compact dimensions.

The fluid power cylinder 1 possesses a cylinder housing 3 with a tubular housing part 4, which at the rear end is closed by an end plate 5 and at the front end by an end plate 6 with a piston rod bearing. The end plate 6 possesses a central through aperture 7, in which a guide and sealing means, not illustrated in detail, is arranged. Said guide and sealing means is for a piston rod 8 extending through the through aperture 7. The piston rod 8 has its inner end region 12, arranged in the interior of the cylinder housing 3, secured to a piston 13 in accordance with the invention. Said piston sealingly divides up the interior space within the cylinder housing 3 in two sequentially arranged cylinder chambers 14 and 15.

A fluid duct 16, which runs through the cylinder housing 3, opens into the rear cylinder chamber 14 associated with the end plate 5 and through such duct a drive fluid, more especially compressed air may be supplied and let off. The front cylinder chamber 15 associated with the end plate 6 with the guide communicates by way of a venting opening 17 at all times with the surroundings. Furthermore in the front cylinder chamber 15 a return spring 18—in the present example a helical compression spring—is arranged, which surrounds the piston rod 8 coaxially with clearance and has its one end borne on the end plate 6 with the guide and the other end on the piston 13.

FIG. 1 shows the basic position of the fluid power cylinder 1, wherein the piston rod 8 has assumed a maximum retraction position. In this case the piston 3 is urged by the force of the return spring 18 against the end plate 5. Supply of drive fluid by way of the fluid duct 16 causes the piston 13 to be shifted toward the guide end plate 6 until it finally abuts the same. The means that the return spring 18 is compressed and the piston rod 8 moves out from the cylinder housing 3. The vent opening 17 then renders possible escape of air contained in the front cylinder chamber 15. In the course of the then ensuing venting of the rear cylinder chamber 14 the piston 13 is moved back by the return spring 18 into the basic position in abutting engagement with the end plate 5.

In the interior of the piston 13 an annular permanent magnet 22 is arranged centered on the longitudinal axis 2. Its diameter is so selected that there is only a small radial clearance between it and the radially outer guide face 24 on the piston 13, the piston sliding at this face against the inner peripheral face of the tubular housing part 41 which constitutes a cylindrical piston running face 23. The arrangement means that the permanent magnet 22 is in the immediate vicinity of the wall of the tubular housing part 4 radially, at or in which a sensor 25 can be arranged, which in a familiar fashion is able to be operated by the magnetic field of the permanent magnet 22. In the illustrated working embodiment one or more longitudinally extending attachment grooves 26 are machined into the outer face of the tubular housing part 4, in which groove or grooves in each respective case a sensor 25 may be set in any desired longitudinal setting in order to respond to a given axial position of the piston 13 and to provide a sensor signal able to be further processed.

The piston 13 comprises two separate piston parts 27 and 27' which in a joint region 32 are fitted together so that mutually facing, axially aligned joint faces 28 and 28' are releaseably set together axially in a releasable coaxial combination.

The axial connection of the piston parts 27 and 27' is due to mounting on the piston rod 8. Each piston part 27 and 27' possesses a rigid, preferably metallic carrying element 33, which is preferably not magnetically conductive. The carrying element 33 possesses a central section 34, which has a central aperture 35. The piston rod 8 is stepped at its inner end region 12 and possesses a terminal attachment section 36 with a reduced diameter, such reduced diameter being generally equal to that of the central apertures 35. The piston parts 27 and 27' are fitted on the attachment section 36, which is received in their central aperture 35, the front piston part 27' abutting the end face 37 of the piston rod section, having a larger diameter, adjoining the attachment section 36. An attachment means 38, constituted for example by a nut, is screwed on the end of the attachment section 36 and engages the rear piston part 27 so that ultimately both piston parts 27 and 27' are firmly clamped and held together between the attachment means 38 and the end face 37.

The two carrying elements 33 are preferably designed in the form of comparatively thin-walled carrying disks 42 and 42'. In the example they possess the stepped, hat-like configuration indicated in the drawing with a disk-like central section 34, which has a central hole in conformity with the aperture 35. The radially outer peripheral region of this central section 34 is coaxially adjoined, by way of a concentrically extending step 43, by a radially outwardly extending carrying section 44, which is in the form of an annular disk. The planes of the central section 34 and of the carrying section 44 preferably extend perpendicularly to the longitudinal axis 2 and are, owing to the step 43, axially offset in relation to one another so that each respective carrying section 44 is at a larger axial distance from the joint region 32 than the central section 34 of the same carrying element 33. The integral connection between the central section and the carrying section 44 produces, in the present example, a substantially hollow cylindrical or tubular transitional wall section 45 adjacent to the step 43. The two piston parts 27 and 27' have their central sections 34 in direct contact with one another. On the contrary owing to the step 43 there is an axial distance apart between the two carrying sections 44 so that there is an intermediate space, which may be employed as an accommodating space for the compact integration of the permanent magnet 22.

The permanent magnet 22 is encapsulated in an annular holding chamber 46, which is arranged in the joint region 32 and has a major part of the its radial width enclosed in the space between the two carrying sections 44 because it extends into this intermediate space radially. The limiting wall 47 of the holding chamber 46 is constituted by two elastic bodies 48 and 48' made of rubber-elastic material with sealing properties, which are molded on each of the respective carrying elements 33 adjacent to the carrying section 44.

Figure 2:
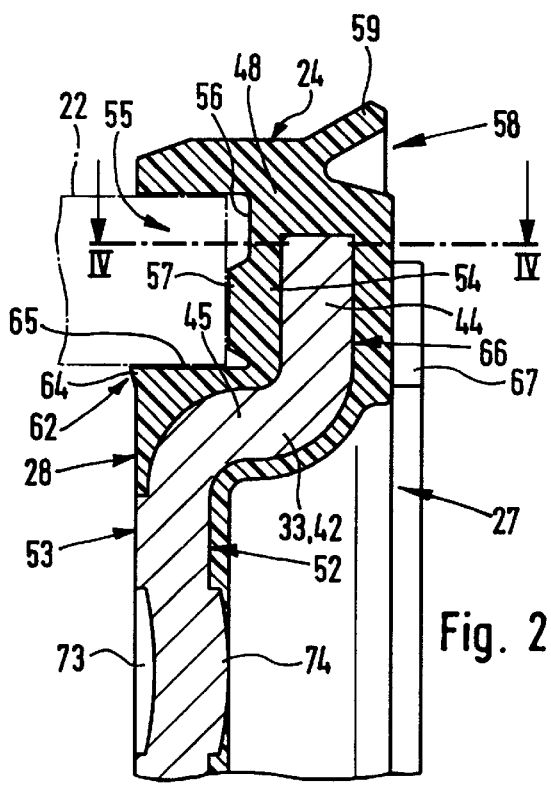
FIG. 2 shows a part of a piston structure of FIG. 1 adjacent to the elastic body on a larger scale.

Each elastic body 48 and 48', whose cross section is particularly well indicated in FIG. 2, preferably covers both the carrying section 44 and also the transitional wall section 45 completely. Moreover, the elastic body 48 and 48' has a thin layer extending over the end faces 52, axially opposite to the joint region 32, as well of the central sections 34 as far as the associated middle aperture 35. The end faces 53 facing the joint region 32, of the central sections 34 are preferably not coated and make direct contact over a large area with each other.

The integral elastic body advantageously combines a plurality of functions. Thus adjacent to the carrying section 44 it forms a holding portion 54, the mutually facing faces of the two holding portion 54 constituting components of the joint faces 28 and 28' of the respective piston part 27 and 27', same resting directly against each other. In the region axially adjacent to the carrying section 44, which is a radial extension outside the associated central section 34, each holding portion 54 possesses an annular holding recess 55 and 55' made in the joint face 28 and 28', such holding recess being centered on the longitudinal axis 2. In the assembled state of the two piston parts 27 and 27' the holding recesses 55 and 55' thereof are complementary to each other and produce the above mentioned holding chamber 46. Accordingly the permanent magnet 22 may be extremely easily fitted in the separated state of the piston parts 27 and 27'.

In the case of a further embodiment, not illustrated in detail, only one piston part has a holding recess for its holding part, the axially measured width of such recess then however being equal to the overall width of the permanent magnet so that same is completely received within the holding part of the one piston part. The holding part of the other piston part in this case constitutes only one axial wall section of the limiting wall without itself possessing any recess. It is in this special case that the carrying element of the elastic body without any holding recess may be an essentially planar disk without any step.

Figure 4:
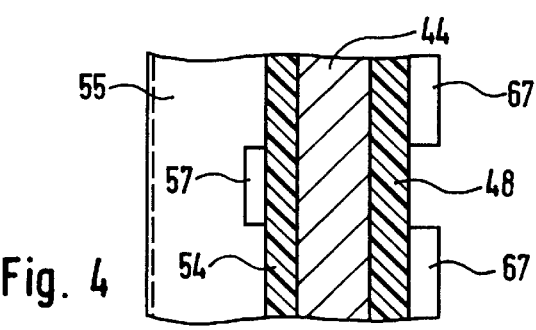
FIG. 4 is a partial cross section taken through the piston part of FIG. 2 on the section line IV—IV to indicate the configuration of the holding projections.

The holding chamber 46 is so shaped that the permanent magnet 22 rests therein without any play. Slight manufacturing inaccuracies in dimensions are compensated for by the rubber-elastic nature of the material in an advantageous manner automatically. In order to make even better use of this tolerance of inaccuracies, in the example on the two axial wall sections 56 of the holding chamber 46, which are formed by the floor of the holding recesses 55 and 55', a plurality of holding projections 57 are respectively molded, such projections being arranged a distance apart and along a line which is peripheral in relation to the longitudinal axis 2. Such projections are, as indicated in FIG. 4, preferably designed with a knob-like geometry and extend axially to a small extent into the holding chamber 46, same then resting against the two lateral faces of the permanent magnet 22, against which they are in abutting relationship. Accordingly the permanent magnet 22 is axially braced between the holding projections 57 of the two elastic bodies 48 and 48' and securely held in its position. Simultaneously, owing to their rubber-elastic properties the holding projections 57 are in a position of adapting themselves to the geometry of the permanent magnet 22 without exerting any excessive thrust on the permanent magnet 22.

A further function of the elastic bodies 48 and 48' is due to the fact that their radially outer region is designed in the form of a lip seal 58, which when in use makes sealing contact with the piston's running face 23. This lip seal 58 is accordingly integrally joined with the holding part 54. It includes, in the present example, an annular sealing lip 59, which possesses an oblique configuration extending both away from the joint region 32 and radially outward, as is made clear in the two FIGS. 1 and 2. In the condition of the piston 13 in which it is fitted in the cylinder housing 3, each respective sealing lip 59 is bent so far inward radially that its outer edge is aligned flush with the guide face 24, such face 24 in the embodiment of the invention also being formed by the elastic body 48 and 48' directly.

Furthermore the elastic bodies 48 and 48' preferably also exert a sealing or gasket function because they prevent drive fluid escaping from the part with the middle apertures 35 and flowing right through the joint region 32 between the piston parts 27 and 27', through the joint region 32 radially outward and past the sealing lip 59 for the low pressure cylinder chamber into the said cylinder chamber. This is made possible by having such a design of the elastic bodies 48 and 48' that are in sealing engagement with each other in at least one sealing zone 62 surrounding the middle aperture 35, such sealing zone being in the form of a complete ring. In the present embodiment the sealing zone 62 has an annular, round form, it being located radially within the holding chamber 46 and preferably adjacent to the radially inner wall section 63 of the limiting wall 47.

In the sealing zone 62 a deformable axial projection 64 is molded on each elastic body 48 and 48', the axial projections 54 on the two piston parts 27 and 27' fitting together snugly in the assembled condition with a clamping effect. It is in this manner that the sealing zone 62 is made with a linear extent with a high performance sealing action.

In the illustrated embodiment the axial projection 64 is designed in the form of a sealing edge with a acute angle in cross section, it being located on the transitional edge joint face 28 and 28' and the radially inner flank 65 of the respective holding recesses 55 and 55'. Owing to the presence of the sealing zone 62 it is unnecessary to arrange a separate sealing ring in the joint region 32 between the piston parts 27 and 27'.

On that portion of a respective elastic body 48 and 48', which runs over the end face 66, which is axially opposite to the joint region 32, of the carrying section 44, at least one impact buffer 67 is integrally molded. In the embodiment a plurality of impact buffers 67 is provided, which are spaced apart in the peripheral direction about the longitudinal axis 2, such buffers being constituted by integrally molded humps and in the embodiment are arranged on a circular line, said buffers having a circularly arcuate longitudinal form. The impact buffers 67 are responsible for a reduction of the intensity of impact of the piston 13, when same runs up against the end plate 5 or the end plate 6 with a guide in the terminal parts of the stroke of the piston.

Owing to the spacing apart of the impact buffers 67 there is the advantage of intermediate spaces 68 between the buffers which render it possible for the drive fluid to be transferred when the impact buffers 67 rest against one of the end plates. Accordingly even at the beginning of a stroke the drive fluid will be able to act on a large working face of the piston 13, since both the regions radially within the impact buffers 67 and also the regions radially outside the same, of the piston's end face may be acted upon.

In the central section 34 as well the end face 52, axially opposite to the joint region 32, of each respective carrying disk 42 and 42' is covered with the rubber-elastic sealing material of the elastic body 48 and 48'. In the peripheral part of the middle aperture 35, this coating, which represents an integral component of the associated elastic body 48 and 48' constitutes a sealing portion 70. It serves for cooperatively sealing on the piston rod 8 and/or the attachment means 38.

Any drive fluid, which makes its way from the rear cylinder chamber 14 through the screw joint between the attachment means 38 and the attachment section 36 into the region with the central apertures 35, is prevented from flowing into the front cylinder chamber 15, since the front piston part 27' has its above mentioned sealing portion 70 in sealing engagement with the end face 37 of the piston rod section adjoining the attachment section 36.

The attachment means 38 itself as well is in sealing contact with the sealing portion 70 of the piston part 27 acted upon by it.

As a material for the respective elastic body 48 or 48' polyurethane (PU) material is to be recommended, which in an injection operation is permanently molded, or NBR material, which is best vulcanized in place.

Owing to the step 43 each piston part 27 and 27' has, on the side axially facing away from the joint region 32, a recess 69 which is peripherally limited by the step 43. The recess 69 in the piston part 27' acted upon by the return spring 18 may, as shown in FIG. 1, serve to accommodate the adjacent end part 72 of the return spring 18 and fix and center same in the desired position.

It is preferred for the carrying disks 42 and 42' to be manufactured as stamped and bent parts. In a combined or sequentially performed stamping and bending operation they are brought in the shape described. It is convenient, in a manufacturing operation starting with the joint face 28 and 28', for several peripherally spaced out pits 73 to be embossed in the disk-like central section 43 in the respective carrying disk, such pits leading to the production of respective humps 74 on the opposite end face 52. These humps 74 may serve, during the molding of the elastic body 48 and 48', for tacking the respective carrying disk in a casting or vulcanizing mold. Accordingly it is then possible to cover the end faces 52 and 66 of the carrying disks 42 and 42', apart from the directly adjacent apical part of each hump 74, completely with the sealing material of the elastic body.

A further advantage of the piston 13 illustrated by was of example is that each piston part 27 and 27' may be employed, if desired, alone as a piston of a fluid power cylinder. Although as a rule this will then mean that the permanent magnet can then not be utilized, there is the possibility of producing fluid power cylinders with a particularly short overall length.

The piston parts 27 and 27' of the embodiment are identical and are symmetrical about the joint region, which for instance extends in a radial plane. However it would also be possible to utilize asymmetrically designed piston parts, should this be desired owing to some particular requirements relevant for the fluid power cylinder.

If in the case of the carrying disks 42 and 42' it is a question of stamped and bent parts, same are best manufactured of steel material. An even better adhesion of the elastic body 48 and 48' is however to be achieved, if the carrying disks 42 and 42' are made of aluminum material and in this respect more particularly as flow-pressed part. Here it is also possible to produce different wall thicknesses and any necessary backing disks or washers may be clamped in place before and behind the piston. Furthermore if ferritic steel material is employed re-annealing, otherwise normally necessary, may be dispensed with.

We claim:

1. A piston for a fluid power cylinder comprising two separate piston parts which are placed together axially in a joint region at mutually facing joint faces with a sealing effect, each piston part possessing a rigid carrying element having a central section with a central aperture for the attachment of a piston rod, said rigid carrying element possessing an annular carrying section, and the two piston parts having central sections thereof resting against one another in the joint region, whereas their carrying sections are set together with an axial clearance from each other and between them enclose at least a part of an annular holding chamber arranged in the joint region and suitable for accommodating an annular permanent magnet, said chamber having a limiting wall being formed by holding portions molded on each of the carrying elements, each of the holding portions possessing, in a radially outer region thereof, a lip seal for sealingly engaging a running face of the piston, wherein each respective lip seal and the holding portion associated with same are constituted by components of an integral elastic body the body being molded on the respectively associated carrying element, and in the joint region the two elastic bodies engaging one another in at least one sealing zone forming a complete ring surrounding the central aperture and being in sealing engagement with each other.

2. The piston as set forth in claim 1, wherein the sealing contact between the two elastic bodies is produced in the at least one sealing zone by annularly surrounding and mutually engaging the sealing portions of the two elastic bodies, the sealing portion of at least one elastic body being formed by a deformable axial projection.

3. The piston as set forth in claim 2, wherein the sealing portion constituted by the axial projection is in the form of a sealing edge.

4. The piston as set forth in claim 1, wherein the sealing zone is placed between the elastic bodies radially within the holding chamber.

5. The piston as set forth in claim 4, wherein the sealing zone is adjacent to a radially inner section of the limiting wall of the holding chamber.

6. The piston as set forth in claim 1, wherein on at least one of the axial sections of the axial wall of the holding chamber includes a knob-like holding projecting formed thereon which extends axially in the holding chamber and is acted upon laterally by the permanent magnet arranged in the holding chamber.

7. The piston as set forth in claim 1, wherein a radial outer face of a respective elastic body constitutes a guide face, which is provided for sliding contact with a piston face.

8. The piston as set forth in claim 1, wherein such two piston parts are substantially identical in design.

9. The piston as set forth in claim 1, wherein at least one of the piston parts constitutes a shortened piston as such.

10. A piston for a fluid power cylinder comprising two separate piston parts which are placed together axially in a joint region at mutually facing joint faces with a sealing effect, each piston part possessing a rigid carrying element having a central section with a central aperture for the attachment of a piston rod, said rigid carrying element possessing an annular carrying section, and the two piston parts having central sections thereof resting against one another in the joint region, whereas their carrying sections are set together with an axial clearance from each other and between them enclose at least a part of an annular holding chamber arranged in the joint region and suitable for accommodating an annular permanent magnet, said chamber having a limiting wall being formed by holding portions molded on each of the carrying elements, each of the holding portions possessing, in a radially outer region thereof, a lip seal for sealingly engaging a running face of the piston, wherein each respective lip seal and the holding portion associated with same are constituted by components of an integral elastic body comprising of a sealing material with rubber-elastic properties, said body being molded on the respectively associated carrying element, in the joint region the two elastic bodies engaging one another in at least one sealing zone forming a complete ring surrounding the central aperture and being in sealing engagement with each other, and wherein the body of each piston part covers an end face of the carrying element, which is axially opposite to the joint region and said elastic body bears one or more impact buffers constituted by one or more humps.

11. A piston for a fluid power cylinder comprising two separate piston parts which are placed together axially in a joint region at mutually facing joint faces with a sealing effect, each piston part possessing a rigid carrying element having a central section with a central aperture for the attachment of a piston rod, said rigid carrying element possessing an annular carrying section, and the two piston parts having central sections thereof resting against one another in the joint region, whereas their carrying sections are set together with an axial clearance from each other and between them enclose at least a part of an annular holding chamber arranged in the joint region and suitable for accommodating an annular permanent magnet, said chamber having a limiting wall being formed by holding portions molded on each of the carrying elements, each of the holding portions possessing, in a radially outer region thereof, a lip seal for sealingly engaging a running face of the piston, wherein each respective lip seal and the holding portion associated with same are constituted by components of an integral elastic body comprising of a sealing material with rubber-elastic properties, said body being molded on the respectively associated carrying element, in the joint region the two elastic bodies engaging one another in at least one sealing zone forming a complete ring surrounding the central aperture and being in sealing engagement with each other and wherein the body of each piston part covers an end face of the carrying element opposite to the joint region of the central section and constitutes a sealing part, which is provided for sealing cooperation with a piston rod.

12. A piston for a fluid power cylinder comprising two separate piston parts which are placed together axially in a joint region at mutually facing joint faces with a sealing effect, each piston part possessing a rigid carrying element having a central section with a central aperture for the attachment of a piston rod, said rigid carrying element possessing an annular carrying section, and the two piston parts having central sections thereof resting against one another in the joint region, whereas their carrying sections are set together with an axial clearance from each other and between them enclose at least a part of an annular holding chamber arranged in the joint region and suitable for accommodating an annular permanent magnet, said chamber having a limiting wall being formed by holding portions molded on each of the carrying elements, each of the holding portions possessing, in a radially outer region thereof, a lip seal for sealingly engaging a running face of the piston, wherein each respective lip seal and the holding portion associated with same are constituted by components of an integral elastic body comprising of a sealing material with rubber-elastic properties, said body being molded on the respectively associated carrying element, in the joint region the two elastic bodies engaging one another in at least one sealing zone forming a complete ring surrounding the central aperture and being in sealing engagement with each other, wherein the two carrying elements are designed in the form of carrying disks, and at least one of the carrying disks a stepped hat-like configuration including a central section having a hole the central section having a stepped outer perimeter.

13. The piston as set forth in claim 12, wherein the stepped outer perimeter of the at least one carrying disk defines a centering recess for receiving an end region of a return spring serving for acting on the piston.

14. The piston as set forth in claim 12, wherein the carrying disks are formed of a stamped and bent material.

15. The piston as set forth in claim 12, wherein the joint face of the central section includes a plurality of annularly spaced embossed dents forming protrusions in an axial face of the central section opposite the joint face, the dents aiding in securing the elastic body to the respective piston part.

16. A piston for a fluid power cylinder comprising:
a first and second piston part each having a facing surface being axially positioned together, each of the first and second piston parts having a stepped outer perimeter forming a carrying section, the carrying sections of the first and second piston part cooperating to form at least part of an annular holding chamber for supporting a magnet;

each piston part including an elastomeric body formed thereon, each of the bodies forming an outer annular lip seal and extending over the carrying section forming a resilient limiting wall of the holding chamber, each body further forming an annular seal formed on the respective piston part facing surface the annular seals of the first and second piston parts cooperating to form an annular sealing zone extending between the piston parts to prevent a fluid from flowing between the first and second piston parts.

17. The piston as defined in claim 16 wherein the chamber includes a pair of spaced sides walls, a top wall and a bottom wall formed by the cooperating bodies such that the magnet in entirely enclosed by the chamber.

18. The piston as defined in claim 16 wherein the bodies of each of the first and second piston parts includes an axially extending projection, and the axial projections of each of the bodies cooperate to form the sealing zone.

* * * * *